Patented June 30, 1942

2,288,016

UNITED STATES PATENT OFFICE 2,288,016

VAPOR ELECTRIC DEVICE

Henry C. Myers, Irwin, Pa., assignor to Westinghouse Electric & Manufacturing Company, East Pittsburgh, Pa., a corporation of Pennsylvania Application October 26, 1940, Serial No. 362,932

4 Claims. (Cl. 175—363)

My invention relates to a vapor electric device and, particularly, to a control system for compensating for unequal division of load between parallel operating vapor electric converters.

In the operation of parallel connected vapor electric devices, such as rectifiers, considerable difficulty has been experienced because of unequal division of load between the parallel connected devices.

I have found that this condition may be corrected by cross-exciting or cross-biasing the exciting devices so that the increase in load current in one of the converters will increase the potential of the other converter so that it will pick up an increased proportion of the load somewhat in the manner of cross-excited series generators. The compensation may be somewhat further improved by adding to the cross control an inverse or compound control from each of the converters.

According to my invention, the cross control is secured by means of current transformers connected in the alternating current supply, the resulting potentials being rectified and applied as a bias to the parallel converting system. In addition to the cross-bias or cross-control, a suitable self control may also be impressed on the control apparatus so that the converter may act somewhat in the manner of cross compounded generators.

It is an object of my invention to provide a control system for securing equalized load division between two or more parallel operating vapor electric converters.

It is a further object of my invention to provide a control system for parallel operated converters in which the potential of one of the parallel operated converters is responsive to the load current of the other parallel operated devices.

Other objects and advantages of my invention will be apparent from the following detailed description taken in conjunction with the accompanying drawings, in which.

Figure 1:
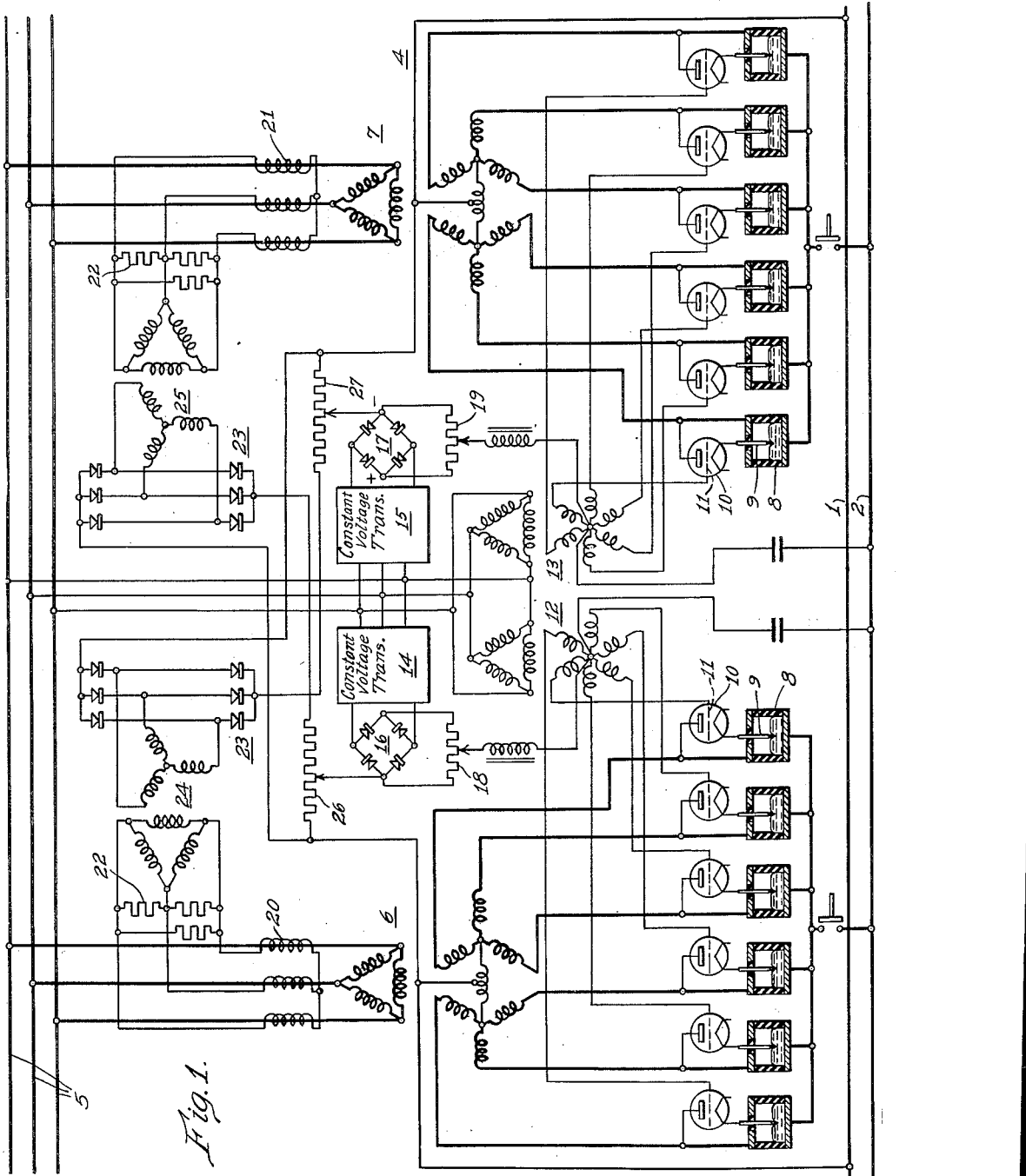
Figure 1 is a schematic illustration of a simplified form of my invention.

In the modification of my invention according to Figure 1, a direct current circuit having negative and positive buses 1 and 2 is supplied with current by a plurality of parallel connected rectifiers 3 and 4 from an alternating current supply circuit herein illustrated as a three-phase circuit 5. Each of the converters 3 and 4 is substantially independent having individual supply transformers 6 and 7, the secondaries of which supply potential to a plurality of vapor electric valves 8 of the parallel converters 3 and 4 herein illustrated as of the make-alive type. The make-alive electrodes 9 of each of the valves 8 is supplied with make-alive potential from any suitable source herein illustrated as so-called anode firing, although it is obvious that any suitable source of firing potential can be utilized.

The application of the firing potential is controlled by means of suitable discharge devices 10, the firing time of which is controlled by a suitable control circuit hereinafter described.

The control grids 11 of the firing tubes 10 are directly controlled by impulse transformers 12 and 13, the primaries of which are connected to any suitable source, such as the three-phase supply circuit 5 referred to above. Secondary potentials of the control or impulse transformers 12 and 13 are biased by means of a connection to the negative bus 1 through a substantially constant bias voltage and a bias potential variable in proportion to the load current of the parallel converter.

The constant control potential is preferably provided by constant potential transformers 14 and 15, the output of which is rectified by suitable rectifiers 16 and 17 and the rectified potential applied to suitable potentiometers 18 and 19. This constant potential is of the same order of magnitude as the load potential of the converter.

In order to secure the potential, variable with the load on the parallel converter, current transformers 20 and 21 are provided in the supply leads of the parallel transformers 6 and 7 and suitable resistors 22 are connected across the terminals of the current transformers in order to stabilize the same. The potential appearing across the stabilizing resistors 22 is applied to the primary of suitable transformers 24 and 25, the output potentials of which are rectified by suitable rectifiers 23 and is supplied across suitable potentiometers 26 and 27 connected in series between the negative bus 1, the constant potential device and the neutral point of the control transformers.

If more than two parallel operating devices are connected in parallel, each of the remaining devices will likewise be connected in the manner as before stated. Obviously, all of the cross controlled rectifiers have identical cross control systems.

In the operation of the parallel converters 3 and 4, according to my invention, the constant potential transformers 14 and 15 will supply sufficient positive potential to substantially counterbalance the negative bias received from the negative bus 1 of the converter so that the control transformers 12 and 13 will operate to supply control potentials to the firing tubes 10 and permit operation of the device.

As load is applied to the parallel converter, a further positive potential will appear across the potentiometers 18 and 19 proportional to the load on the alternate converters 3 or 4, which will add a further positive bias and permit earlier firing of the firing tubes 10 which will increase the load carried by the control converter.

So long as the load divides evenly all of the parallel converters will increase or decrease according to the load, however, assume converter 3 to assume a greater amount of load than converter 4 then the current transformer 20 will produce a larger potential than transformer 21 so that the positive bias on potentiometer 27 is greater than the bias on potentiometer 26. As a consequence the control transformer 13 has a higher positive bias than transformer 12 so that the tubes 10 controlling the valves 8 of converter 4 fire earlier than the valves of converter 3 so that converter 4 increases its load to restore the proper load division.

Figure 2:
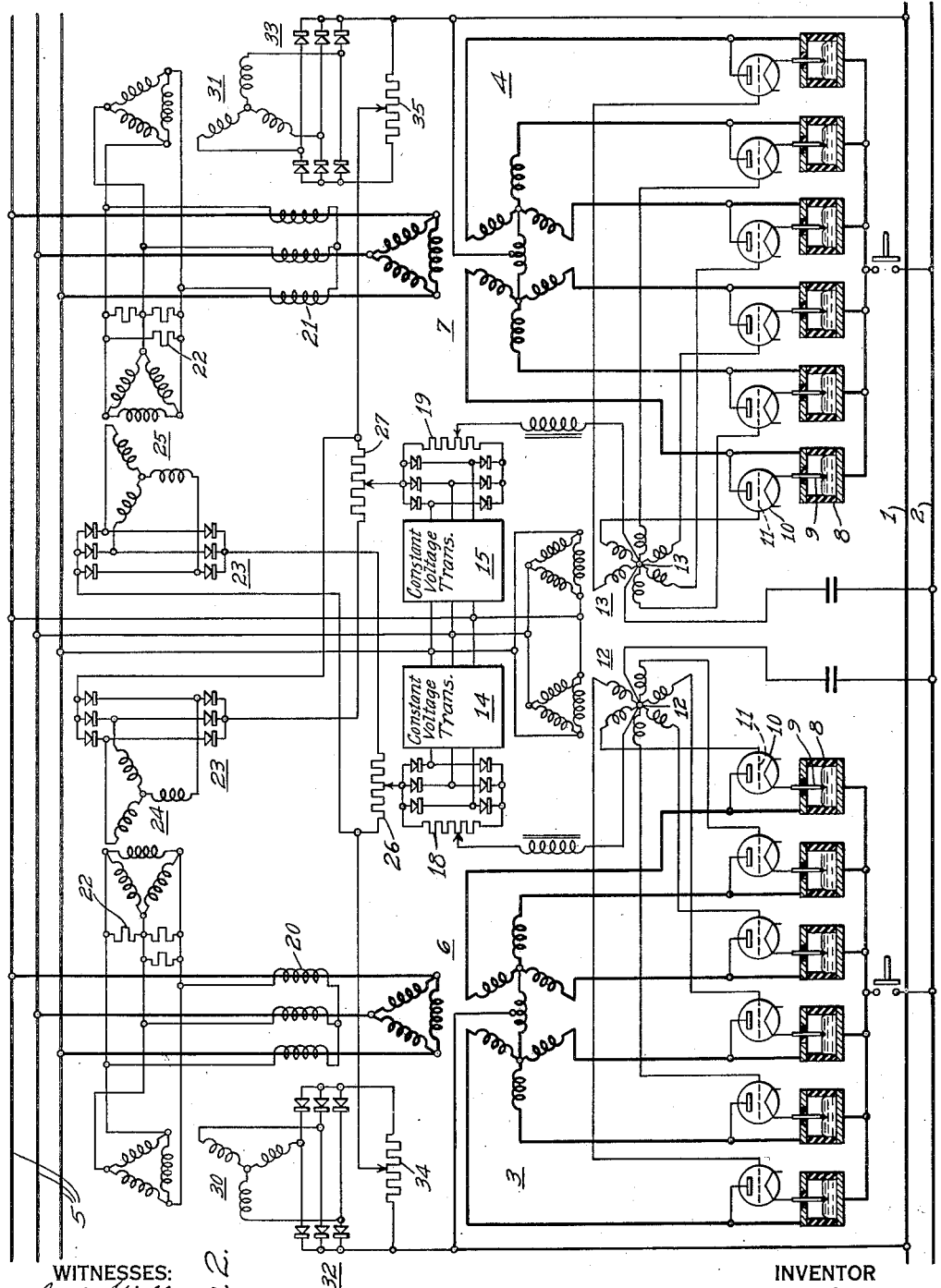
Fig. 2 is a similar illustration showing a modification having cross and series control.

In a modification of my invention, according to Fig. 2, I have added a series control, preferably an inverse control in the biasing circuit. The current transformers 20 and 21, in the controlled converters in addition to supplying energy to the cross control transformers 24 and 25, supply potential to further control transformers 30 and 31, the output of which is rectified by suitable means 32 and 33 and applied to suitable potentiometers 34 and 35 in series with the biasing circuit of the control transformer. Preferably, the potential of this self control or series control is connected inversely so that the increase in load on the control converter tends to increase the negative bias and thereby retard the firing time and reduce the load on the control converter.

In the operation according to this form of my invention the sensitivity of the parallelling action is materially increased while maintaining the normal regulation characteristic of the overall converter system.

While for purposes of illustration I have shown and described a specific embodiment of my invention, it will be apparent that changes and modifications can be made therein without departing from the true spirit of my invention or the scope of the appended claims.

I claim as my invention:

1. A vapor electric conversion system for transferring electric energy between an alternating current circuit and a direct current circuit comprising a plurality of parallel operating converters, each converter including a transformer interconnecting the circuits and a plurality of electric valves for controlling the flow of energy through said transformer, a control electrode for each valve of each of said converters, a source of control energy for said control electrodes, auxiliary valves for applying said control energy to said control electrodes, an impulsing transformer for controlling the auxiliary valves of each converter, a biasing system for each impulsing transformer including a constant biasing potential, a biasing potential proportional to the load on a parallel operating converter other than the converter being controlled and circuit means for connecting said biasing potentials in series between the impulsing transformer of the converter being controlled and the negative direct current bus.

2. A vapor electric converter system comprising a plurality of parallel operating valve type converters, control electrodes for each valve of said converters, a source of control potential for said control electrodes, auxiliary valve means for controlling the application of the control potential to the control electrodes, an impulsing transformer for each converter, a biasing system including the negative load potential, a positive potential substantially of the order of magnitude of the load potential, a potential variable with the load on the converters operating in parallel other than the converter being controlled and means for impressing said biasing potentials in series on the impulsing transformer of the converter being controlled.

3. A vapor electric converter system comprising a plurality of parallel operating valve type converters, control electrodes for each valve of said converters, a source of control potential for said control electrodes, auxiliary valve means for controlling the application of the control potential to the control electrodes, an impulsing transformer for each converter, a biasing system including the negative load potential, a positive potential substantially of the order of magnitude of the load potential, a potential variable with the load on the converters operating in parallel other than the converter being controlled, a potential variable with the load of the individual converter being controlled and means for impressing said biasing potentials in series on the impulsing transformer of the converter being controlled.

4. A vapor-electric conversion system for tranferring electric energy between an alternating current circuit and a direct current circuit comprising a plurality of parallel operating converters, each converter including a transformer and a plurality of make-alive type valves for controlling the flow of energy through said transformer, a make-alive electrode for each valve of each of said converters, a control transformer for the make-alive electrodes of each of said converters, auxiliary means for applying high-peaked control energy from said control transformers to the respective make-alive electrodes, an impulsing transformer for each converter, said impulsing transformer controlling the associated auxiliary means, means for supplying biasing potential to each impulsing transformer including a constant potential transformer, means for converting the output of said constant potential transformer to direct current, a current transformer energized by the current in a parallel converter other than the converter being controlled, means for reducing the potential of said current transformer to direct current and circuit means for connecting said potential in series with the negative potential of the direct current circuit of the connecter being controlled.

HENRY C. MYERS.